US006595723B2

(12) United States Patent
Ianniello et al.

(10) Patent No.: US 6,595,723 B2
(45) Date of Patent: Jul. 22, 2003

(54) CONVERSION OF GYPSUM STACKS TO WASTE CONTAINMENT FACILITIES AND RELATED CONSTRUCTION AND BUSINESS METHODS

(76) Inventors: Peter J. Ianniello, 26 S. Union St., Havre de Grace, MD (US) 21078; Mark Topp, 13229 Emerald Acre Dr., Dover, FL (US) 33527; Tracey R. Johnson, 5405 Twin Creeks Dr., Valrico, FL (US) 33594

( * ) Notice: Subject to any disclaimer, the term of this patent is extended or adjusted under 35 U.S.C. 154(b) by 0 days.

(21) Appl. No.: 10/231,469

(22) Filed: Aug. 30, 2002

(65) Prior Publication Data
US 2003/0053865 A1 Mar. 20, 2003

Related U.S. Application Data
(60) Provisional application No. 60/316,037, filed on Aug. 31, 2001.

(51) Int. Cl.[7] ................................................. B09B 1/00
(52) U.S. Cl. .............................. 405/129.95; 405/129.7; 428/2; 264/633; 52/86; 52/169.7
(58) Field of Search ..................... 405/129.7, 129.95; 428/2; 264/633; 52/86, 169.7

(56) References Cited

U.S. PATENT DOCUMENTS

| | | | | |
|---|---|---|---|---|
| 4,076,862 A | * | 2/1978 | Kobeski et al. | 427/136 |
| 4,432,666 A | * | 2/1984 | Frey et al. | 588/257 |
| 4,457,781 A | * | 7/1984 | Palmer et al. | 106/773 |
| 4,464,081 A | * | 8/1984 | Hillier et al. | 588/259 |
| 4,908,129 A | * | 3/1990 | Finsterwalder et al. | 210/170 |
| 4,973,195 A | * | 11/1990 | Sweeney et al. | 405/129.57 |
| 5,040,920 A | * | 8/1991 | Forrester | 405/129.15 |
| 5,078,543 A | * | 1/1992 | Terrel | 405/129.57 |
| 5,320,450 A | * | 6/1994 | Smith | 405/129.9 |
| 5,358,760 A | * | 10/1994 | Furlong et al. | 428/70 |
| 5,516,830 A | * | 5/1996 | Nachtman et al. | 524/446 |
| 6,082,929 A | * | 7/2000 | Williams | 405/129.55 |
| 6,096,373 A | * | 8/2000 | Nachtman et al. | 427/136 |
| 6,231,767 B1 | * | 5/2001 | Krofchak et al. | 210/697 |
| 6,235,257 B1 | * | 5/2001 | Palm et al. | 423/320 |
| 6,435,770 B1 | * | 8/2002 | Shi | 405/129.9 |

FOREIGN PATENT DOCUMENTS

WO    WO 02/060817 A1 * 8/2002 ............. C01F/1/00

OTHER PUBLICATIONS

Code of Federal Regulation, 40 CFR 61 Subpart R, "National Emissions Standards for Radon Emissions from Phosphigypsum Stacks", as revised Oct. 17, 2000, 7 pages.*

* cited by examiner

Primary Examiner—J. J. Swann
Assistant Examiner—Katherine Mitchell
(74) Attorney, Agent, or Firm—Gary L. Shaffer

(57) ABSTRACT

The invention pertains to the conversion of waste materials derived from gypsum mining and processing, such as existing gypsum stacks, into waste containment or landfill facilities. Methods of the invention include the creation of waste containment facilities from existing gypsum stacks. Waste containment facilities created according to the invention can be used for the short-term, long-term or permanent storage of waste materials such as solid waste, community refuse materials, biomass, industrial waste, phosphate waste, and for composting or otherwise processing materials such as biomass. Containment facilities according to the invention can be lined or unlined, open or capped, depending upon the nature of the material to be resident in the containment facility and relevant governmental regulations. The invention also provides for drainage and recovery systems, monitoring, controlling and communication means, pumps and valving means, and any other means known in the waste containment facility field.

29 Claims, 6 Drawing Sheets

CONVERSION OF GYPSUM STACKS TO WASTE CONTAINMENT FACILITIES AND RELATED CONSTRUCTION AND BUSINESS METHODS

RELATED APPLICATIONS

The present application claims priority to U.S. Provisional Application Serial No. 60/316,037, filed Aug. 31, 2001, which is hereby incorporated by reference.

FIELD OF THE INVENTION

The invention relates to the conversion of piles or stacks of waste gypsum and phosphogypsum, "gypsum stacks," into containment facilities for the storage and processing of refuse materials such as solid waste, biomass, industrial waste, and phosphate waste. The means and methods of the invention are applicable also to the conversion of other mineral waste piles into waste containment and processing sites. Advantageously, the present invention affords methods for deriving revenue from heretofore negative mineral waste storage assets.

BACKGROUND OF THE INVENTION

The mining of gypsum or phosphogypsum produces incredible volumes of gypsum and phosphogypsum waste. This waste is typically stacked in very large piles, or gypsum stacks, which sometimes cover up to 400 acres in area to a depth of 100 to 200 feet or more. Thus, the land upon which the gypsum or phosphogypsum waste is stored is severely restricted with respect to any future uses. Therefore, gypsum stacks typically provide economic drain on the landowner or landholder.

Currently, a closed or capped phosphogypsum stack poses several economic challenges to the phosphate industry. In addition to the loss of use of the land upon which the stack is situate, governmental regulations that impose post-closure maintenance requirements necessitate ongoing expenses for decades. Until the current invention, gypsum stacks and other mineral waste sites, provided little or no economic return for gypsum mining companies to offset these ongoing expenses. Thus, for every company in the U.S. and abroad that mines, processes or produces gypsum, a gypsum stack always generates the inevitable: a large nonperforming asset. Numerous gypsum stacks currently exist with many more yet to come.

The present invention provides means and methods for converting presently existing gypsum stacks, or other mineral waste piles such as those found in any type of mining activity, into huge containers for holding refuse like biomass such as sugar, sugar cane, sugar cane waste, seaweed, fish, fish waste, shellfish, shellfish waste, agricultural waste, waste from forestry operations, other solid wastes, industrial waste or phosphate waste. The present invention is similarly applicable to other mineral waste piles such as those found in many types of mining activities, strip mining for example. The present invention also provides methods of doing business that will turn existing and future phosphogypsum stacks or mineral waste piles into income-producing waste containment and processing facilities.

Gypsum and waste phosphogypsum are capable of being formed into container structures which will withstand high compressive loads. Gypsum and phosphogypsum waste can therefore be used to form the bottom and walls of large containers. Thus, present gypsum stacks can be excavated to form large concavities which can be used as receptacles for solid waste. Current and future gypsum stacks can be formed into containers having one or more concavities as they are being created or enlarged. These concavities can be lined with geosynthetic liners or other membranes in order to prevent or limit leakage from the concavity. Examples of suitable geosynthetic fabrics, membranes, geocomposites, liners, liner combinations and liner-drain combinations and systems can be found in *Designing With Geosynthetics, 2nd Edition,* by Robert M. Koerner (1990, Prentice-Hall, ISBN 0-13-202300-8) which is incorporated herein by reference. Space in a concavity according to the present invention can be used to store waste materials, thereby providing an income-producing use of the gypsum stack or other mineral waste pile, and the land upon which they are located.

Thus, by providing hitherto unavailable waste storage facilities, the present gypsum stack and mineral waste pile conversion invention will significantly decrease the amount of new land that is used for landfills, while simultaneously converting gypsum stacks or waste piles from nonperforming assets into income-generating landfill facilities. The present means and methods for converting gypsum stacks or mineral waste piles into waste containment facilities is both economically and environmentally advantageous.

For instance, in comparison with conventional methods that would clear an additional 400 or more acres of forested or otherwise productive land to create a new MSW or C&D landfill, the present invention affords, among other advantages, at least one additional use for the presently existing tract of 400 or more acres of land by converting the space above, within or partially within an existing gypsum stack or mineral waste pile into waste containment or processing facilities. According to the present invention, instead of creating a new landfill or waste containment facility on a heretofore productive or uncleared parcel of land, the new landfill is constructed on top of, or wholly or partly within, a gypsum stack or other mineral waste pile, thereby sparing the productive land. Indeed, with the installation of one or more liner systems, and some minor modifications to the conversion site, the conversion site is very quickly able to receive waste such as biomass or other refuse.

The economic advantages of the present invention are significant. For instance, the governmental permits for establishing a 400-acre landfill are as much as $800,000.00. The present invention eliminates or substantially reduces such expenses because phosphogypsum stacks are already permitted as waste disposal sites. Thus, the present invention provides for an income-producing dual use of land upon which gypsum stacks or other mineral waste piles already exist.

In conventional use in the United States, when gypsum stacks reach maximum capacity at 100 to 200 feet of elevation, they are capped with an HDP membrane or liner in accordance with EPA regulations. In some embodiments of the present invention, the already existing gypsum stack cap membrane or liner can be used as a bottom liner for a waste containment concavity. Therefore, the cost to install a secondary liner in a landfill bottom liner system is reduced or eliminated in some embodiments of a phosphogypsum stack conversion according to the invention because the secondary liner is already in place in the form of the gypsum stack cap membrane or liner.

An additional economic advantage of the present invention pertains to subgrade costs. The costs relating to the preparation of the subgrade of a waste-containing site, which often requires the importation of clean subgrade material from offsite sources, can be as much as $2,000,000 U.S. for a 400-acre site. This expense is substantially reduced or eliminated with some embodiments of the present gypsum stack conversions since the phosphogypsum already available at the gypsum stack conversion site can be used as the subgrade material.

One significant aspect of the present invention is based upon the engineering parameters of mineral waste having high compressive strengths, such as waste gypsum, phosphogypsum or other mineral mining waste or byproducts. With the present invention, such waste or byproducts can be formed into one or more large concavities. Formation of a concavity according to the invention, can be effected, for instance, by excavation into an existing gypsum stack and then adding side walls of waste gypsum on top of the stack to extend the depth of the concavity to a desired dimension, by forming a concavity directly from phosphogypsum waste as the waste is being added to a particular geographic site, or by any other method or means that result in one or more concavities of desired dimensions. The concurrent delivery of waste and formation of the concavity is particularly useful when the gypsum waste is being transported to the site in the form of aqueous slurry, which may then be provided with strengthening binders or additives such as Portland cement as the concavity is being formed on top of an existing stack or as the concavity is being formed in place on the site. Thus, the cost of excavating a gypsum stack will be diminished.

The present invention can be used also with conventional means, devices and elements of the waste containment arts to thereby arrive at a facility of desired capabilities and capacities. For example, depending on the use to which a particular concavity is to be placed, liners or covers can also be provided to seal the bottom, walls or top of the concavity. Also in accordance with the invention, binders such as cement, for example Portland cement, can be combined with the phosphogypsum waste as it is being transported to the containment site. Addition of binders, such as cement, may be used to increase the compressive strength of the waste gypsum material and thereby assist in stabilizing the shape of the resulting concavity.

There is therefore a need for methods and means to provide additional and alternate uses for mineral waste piles, such as gypsum stacks. There is also a need for methods of forming phosphogypsum stacks into facilities useful for such purposes, and for business methods for producing revenue streams from such facilities.

SUMMARY OF THE INVENTION

It is therefore an object of the present invention to provide business methods for realizing income from gypsum stacks and other waste mineral piles and facilities.

It is similarly an object of the present invention to provide waste containment facilities from gypsum waste and byproducts by forming them into such facilities.

It is also an object of the present invention to convert existing gypsum stacks into useful waste containment, processing and storage facilities.

It is a further object of the present invention to provide biomass storage and processing facilities formed primarily of waste gypsum.

In accordance with these and other objects of the invention, a waste containment facility is provided. A containment facility according to the invention preferably is formed at least partly or wholly from an existing gypsum stack, the facility being constructed and arranged to comprise at least one concavity suitable for the storage or processing of waste. In other preferred embodiments of the invention, a concavity of the containment facility is formed wholly from an existing gypsum stack, for example, by excavation. Still other preferred embodiments of the invention are formed from gypsum or phosphogypsum waste by forming the waste materials into shapes that include one or more concavities suitable for use to contain one or more different types of waste.

Facilities according to the invention are suitable for, or adaptable to, containing, storing or processing solid, liquid or gaseous wastes or any combinations thereof. The present waste containment facilities can be adapted to store or process virtually any type of waste or mixture of waste as necessary or desired. For example, waste containers of the invention are suitable for storing one or more types of waste including industrial waste, phosphate waste, biomass, refuse from a community, and sewage.

In accordance with other aspects of the present invention, concavities of a containment facility may be provided with one or more sheetlike elements, or layers of sheetlike elements, for lining, covering or adapting the concavity to storing or processing a particular type of waste. Such sheetlike elements include membranes such as geomembranes, geosynthetic clay liners, felt, glass fibers, fiberglass, filtration fabrics, geonets, geotextiles, geogrids, geopipes, and geocomposites. One or more of the sheetlike elements may function as permeable or impermeable liners for the concavity, or as filters, leachate collectors, gas collectors, permeable covers, impermeable covers, removable covers, permanent covers, microbial reservoirs, drains, drain matrices, partitions and subcontainers. Sheetlike elements according to the invention may be made of any natural or synthetic material so long as they perform the desired function in the containment facility. For example, the membranes, liners, covers or other sheetlike elements of the present invention may comprise one or more from the group consisting of HDPE, ZFPE, TVC, and fPTR.

In some preferred embodiments of the present invention, a cover system may be provided. The cover system may be permanent, for example, comprising one or more synthetic or natural membranes or sheetlike elements covered by earth and plants. The cover may also be temporary in nature, for instance, wholly or at least partially removable so that access to the concavity or its contents is available.

Containment facilities according to the present invention may include any additional features or elements as known in the field of waste containment, storage or processing, including one or more drains, sumps, drain fields, transfer and delivery pumps, drain matrices, leachate collectors, leachate removal or processing systems, valves and valving means for directing or controlling the flow of leachate fluids or other drainage products from the waste.

In accordance with further aspects of the invention, waste containment facilities may comprise means for controlling and monitoring the content, quantity, conditions, or changes of one or more parts of the facility, or the waste contained in the facility. Any monitoring means are within the scope and spirit of the invention, and include one or more of data collection means, data forwarding means such as telemetering devices, data analysis means, gas detectors, gas identification sensors, chemical sensors, pressure sensors, temperature sensors, fluid flow sensors, pH sensors, gas sampling means, gas recovery means, microbial sensors and microbial condition sensors. Sensors, detectors and control devices and elements are useful in some embodiments of the invention for controlling the conditions, content, and changes of waste contained or processed in a facility. These are particularly advantageous in embodiments of the invention where a plurality of concavities, or "farm" is provided for the storage or processing of one or more types of waste, and the farm has a centralized monitoring and control facility.

The invention also provides advantageous methods for deriving revenue from gypsum stacks and other mineral waste sites, as well as for converting gypsum stacks into waste containment or processing facilities. One method for forming a waste containment facility from gypsum waste, comprises the steps of providing a gypsum stack comprising gypsum waste, and excavating the gypsum stack to comprise at least one concavity suitable for storing or processing waste materials. Further steps include providing a lining for the concavity or plurality of cavities such as one made from one or more sheetlike elements such as membranes, geomembranes, geosynthetic clay liners, felt, glass fibers, fiberglass, filtration fabrics, geonets, geotextiles, geogrids, geopipes, and geocomposites. The sheetlike elements may be disposed to have one or more functions with respect to the one or more concavities. For example, the one or more sheetlike elements may function as liners, filters, leachate collectors, sumps, permeable covers, impermeable covers, removable covers, permanent covers, temporary covers, microbial reservoirs, drains, drain matrices, partitions and subcontainers. Non-membrane like lining materials include one or more cementitious materials, such as Portland cement or concrete.

Methods according to the invention may include further steps such as providing for the at least one concavity, one or more of pumps, drains, drain matrices, sumps, leachate collection systems, valves, valving means for directing or controlling the flow of fluids or leachate from the waste, and one or more means for monitoring the content, conditions, or changes thereof with respect to the waste contained in the facility. Examples of types of devices or means for monitoring concavities according to the invention include data collectors, data forwarding means such as telemetering systems, data analyzers, gas detectors, gas identification sensors, chemical sensors, pressure sensors, temperature sensors, fluid flow sensors, pH sensors, gas sampling means, gas recovery means, microbial sensors and microbial condition sensors.

The invention also provides for controlling the conditions, content, and changes of the waste contained in one or more concavities of a facility. For example, when biomass is being processed according to the invention, water might be added or removed in order to facilitate a desired microbial metabolic rate. In some embodiments of the invention, at least one monitoring and controlling facility is provided to monitor or control the conditions in the one or more concavities.

Any method of converting a gypsum stack into one or more concavities, or of forming waste gypsum or phosphogypsum into a waste containment facility, is within the scope of the invention. One preferred embodiment of such methods includes the steps of providing phosphogypsum waste to a site in the form of an aqueous slurry, and then applying the slurry, for example sequentially, to a surface of the site such that one or more concavities are formed. Advantageously, this method can employ the same pipes or conveyors that are typically used to transport phosphogypsum to conventional gypsum stack waste sites. As a further advantage, the methods of the present invention include adding cementitious additives such as Portland cement to the slurry in order to increase the strength of the various portions of a concavity.

Another preferred method for converting a gypsum stack according to the invention includes adding phosphogypsum waste materials onto the top of an existing stack such that at least one concavity suitable for containing or processing refuse is formed on top of the stack. In this embodiment, the waste may be provided in any form that produces a concavity of desired strength and dimension. By way of example, adding the gypsum waste to the top of the stack in the form of a slurry, in a sequence that permits drying, grading or forming of the slurried materials into the floor and walls of concavities of desired dimension is one preferred means of forming waste containment facilities of the invention.

As a further economic benefit, the present invention provides for the installation of one or more of drainage means, monitoring means and controlling means at the same time that the concavity is being formed. In cases where concavities according to the invention are being formed as waste gypsum is conveyed to the top of an existing gypsum stack, or to the land surface of a new waste site, for example, the elements of the drain matrix to be associated with the concavity may be laid down at appropriate positions and intervals as the structure is created. Similar advantages pertain to the installation of monitoring and controlling devices concurrently with the creation of concavities of the invention. In general, any means for draining, monitoring or controlling any parameter of a containment facility according to the invention, including but not limited to those listed herein, may be installed at any desirable time during creation of that facility.

The present invention provides also methods for producing revenue from mineral waste sites such as those that have been heretofore performing as negative assets. One embodiment of a business method according to the invention comprises the steps of providing a waste site suitable for having mineral waste thereon or therein, such as a gypsum stack site or a site having other mining waste, such as that derived from coal or iron strip mining, forming the mineral waste into at least one concavity; and renting or leasing the concavity for the storage or processing of waste materials. Any permutation of embodiments of the storage facilities described herein can be used with the business methods of the invention. Preferred facilities include those where the mineral waste comprises gypsum or phosphogypsum suitable for forming a gypsum stack, or an existing gypsum stack, formed into a plurality of cavities. Additional revenue may be derived from providing services relating to storing, processing and monitoring the waste materials that are contained, stored or processed in the concavities of facilities according to the invention. Preferably, one or more concavities are provided with one or more of liners, filters, pumps, leachate collectors, sumps, permeable covers, impermeable covers, removable covers, permanent covers, microbial reservoirs, drains, drain matrices, partitions and subcontainers. By using subcontainers, different materials may be stored or processed in the same concavity.

An additional method for producing revenue from mineral waste sites according to the invention pertains to the processing of any type of biomass in facilities of the invention, and then selling the resulting useful products such as compost, methane and ethane. Thus, the present invention provides for the processing of unwanted biomaterials, such as sugar cane, sugar, sugar cane waste, lawn clippings, pulpwood waste, horticultural and forestry byproducts and waste, seaweed, fish, fish waste, shellfish, shellfish waste, and agricultural waste such as cornstalks and spoiled hay, into useful and revenue-producing products.

In one preferred embodiment, a method for deriving revenue according to the invention comprises the steps of providing a waste site having mineral waste thereon or therein, forming the mineral waste into one or a plurality of concavities, renting or leasing one or more of those concavities for the storage and processing of biomass materials, then processing the biomass materials, for example by composting them with bacteria, into usable products, and selling the usable products.

DETAILED DESCRIPTION OF SOME PREFERRED EMBODIMENTS OF THE INVENTION

The present invention will now be described in detail with respect to FIGS. 1 through 6. As one of skill in the art of waste containment facilities will comprehend, the embodiments of the present invention shown in the accompanying figures are exemplary and not exclusive. Numerous other embodiments and permutations of the present invention are within the scope and spirit of the present invention.

Figure 1A:
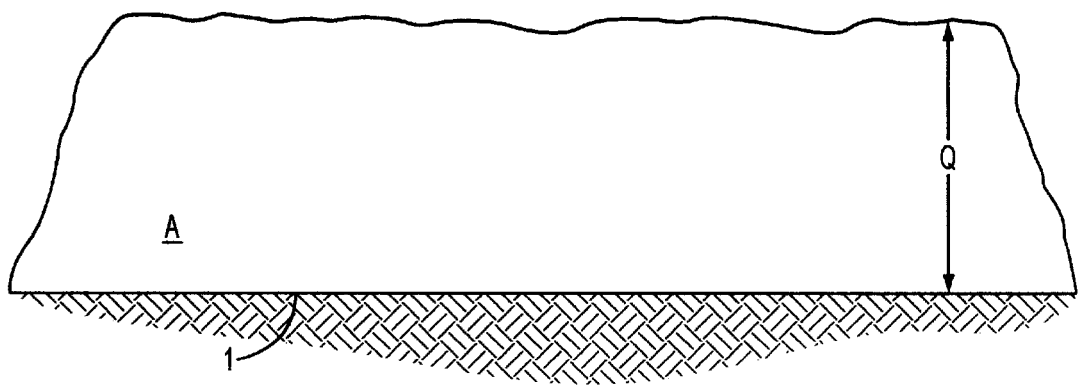
FIG. 1(a) is a side view of gypsum stack A as is typically found in gypsum producing areas.

With respect to FIG. 1(a), gypsum stack A comprises waste gypsum or phosphogypsum piled above land having natural ground level 1. Gypsum stack A has thickness dimension Q, typically from 50 to 200 feet thick, and top surface 75.

Figure 1B:
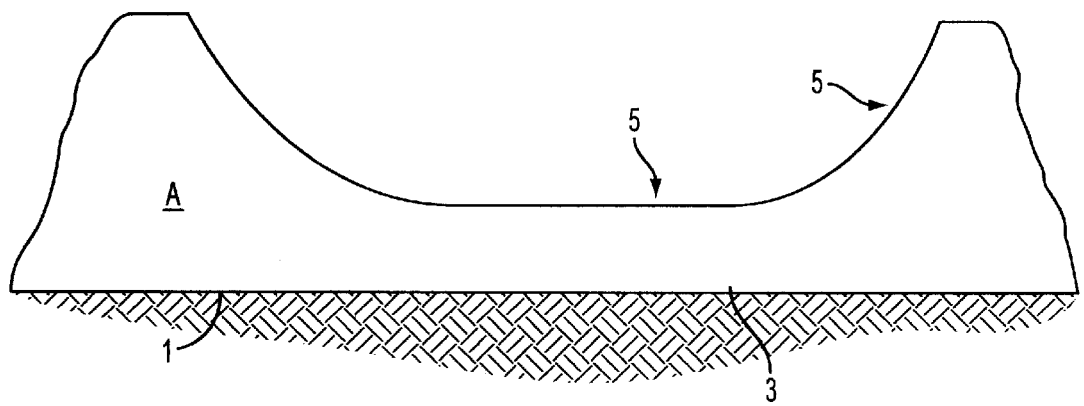
FIG. 1(b) shows gypsum stack A which has been excavated to form a waste containment facility.

FIG. 1(b) shows gypsum stack A, which has been excavated to form concavity 5 of compacted waste gypsum 3. Concavity 5 extends downward from gypsum stack top surface 75, to a desired depth and has curved walls 8. In accordance with the invention, waste gypsum 3 of gypsum stack A has been excavated by means of heavy equipment, such as backhoes or bulldozers, to form the boundaries of concavity 5.

Figure 1C:
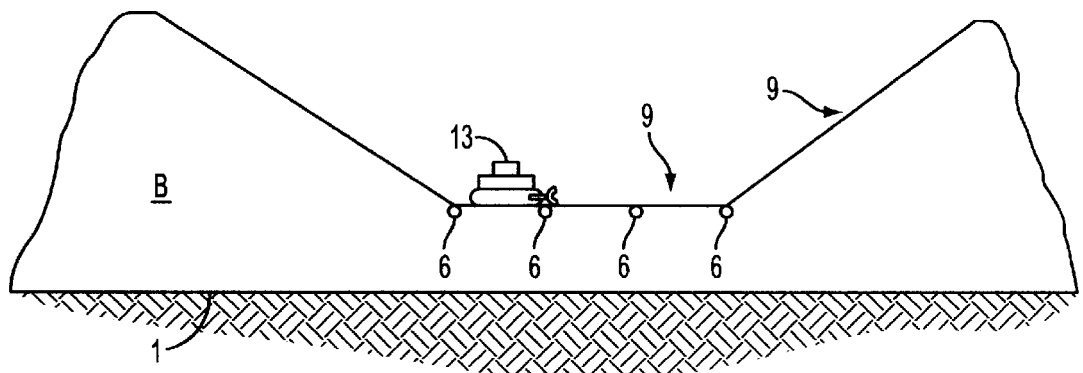
FIG. 1(c) shows gypsum stack B which has been excavated to form a waste containment facility, including a drain matrix.

FIG. 1(c) shows gypsum stack B, having relatively flat angled walls 10 and relatively flat bottom 12 that together form excavated concavity 9. Angled walls 10 extend from top surface 75 of gypsum stack B to bottom 12. Drain matrix 6 is provided below the surface of bottom 12 for the purpose of draining or processing leachate that will be stored in concavity 9. In accordance with one aspect of the invention, concavity 9 can be excavated by means of bulldozer 13, for example.

Figure 2:
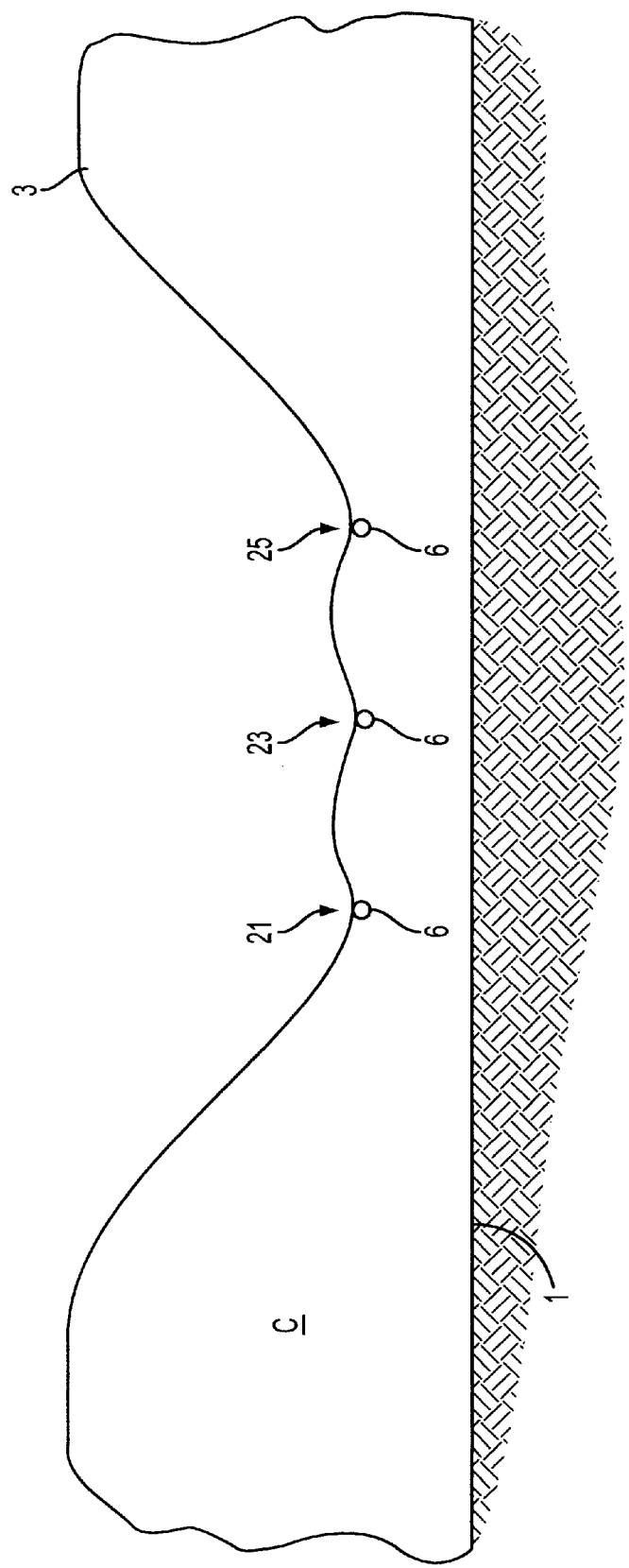
FIG. 2 is a side view of gypsum stack C which has been excavated to form a waste containment facility comprising sumps and a drainage matrix.

FIG. 2 is a side view of gypsum stack C which has been excavated to form a waste containment facility comprising sumps and a drainage matrix. Concavity 14 is formed by the excavation of waste gypsum 3 of gypsum stack C through the use of, for instance, bulldozers, backhoes, and other heavy excavating equipment. The boundaries of concavity 14 are formed by curved wall 30, rough slanted wall 28 and undulating bottom 22 comprising sump 21, sump 23 and sump 25. Sumps 21, 23 and 25 are provided with drain matrix 6 that lies far enough above natural ground level 1 so that leachate or processed fluids from waste to be stored in concavity 14 do not reach ground level 1.

Figure 3:
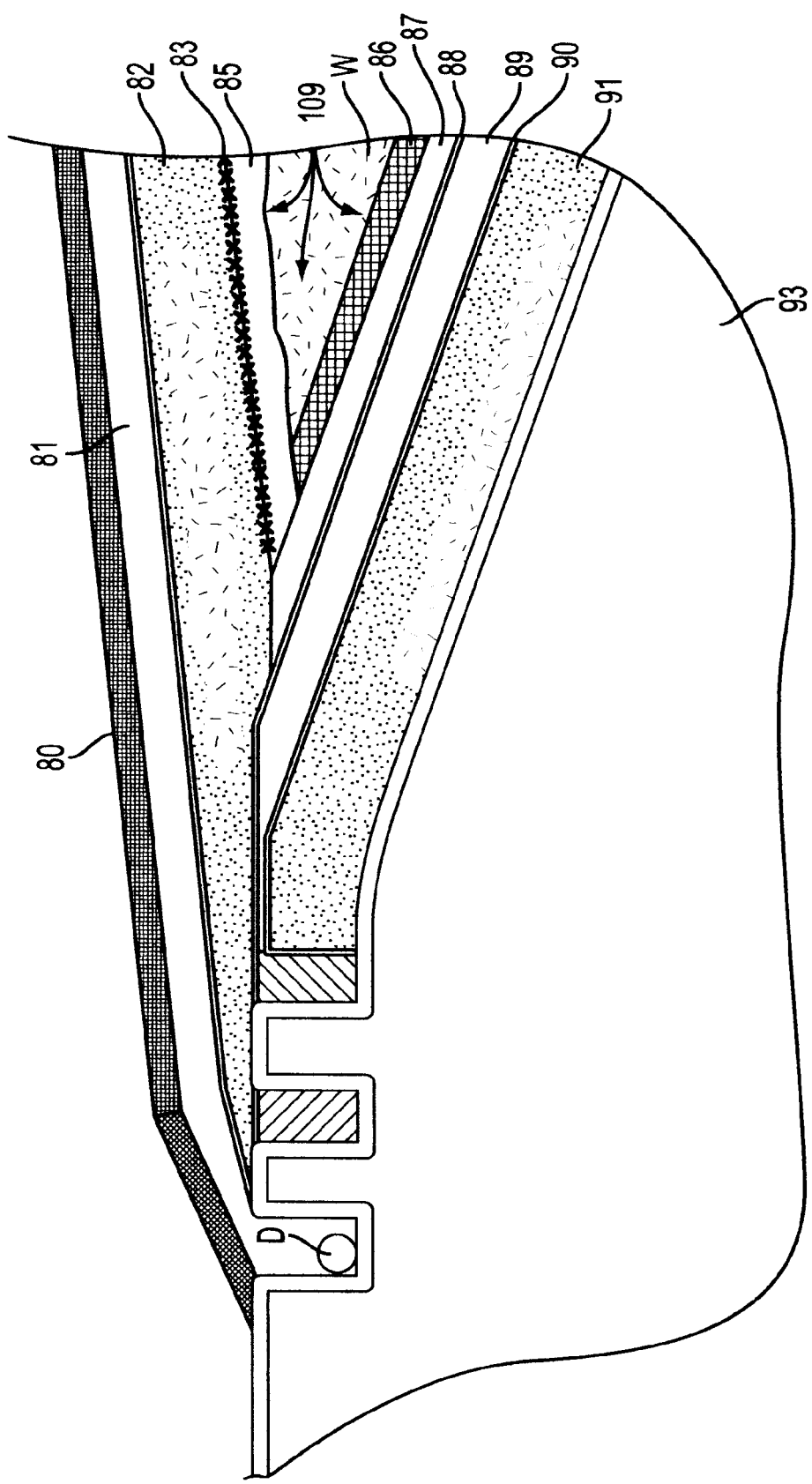
FIG. 3 is a detailed side view of a typical liner and cap system for use with some embodiments of the invention.

FIG. 3 is a side view of a typical liner system for use with some embodiments of the invention. With respect to FIG. 3, waste gypsum 3, having concavity 109 formed therein, is provided with layered liner elements adjacent waste gypsum 93 and below waste W, and layered cap elements above waste W stored in concavity 109. As is typical in the waste containment field, layered cap elements include capping membrane 80, geogrid cap drainage spacer 81 which communicates with drain matrix pipe D, compacted clay cap layer 82, geotextile gas vent 83 and operational cover membrane 85. Layered liner elements adjacent waste gypsum 93 include filter layer 86, primary leachate collection layer 87, primary geomembrane 88, leak detection geospacer layer 89, secondary geomembrane 90, and compacted clay layer 91 which is immediately adjacent waste gypsum 93. As one of skill in the art will appreciate, numerous permutations of caps and liner elements are adaptable for use with the invention.

Figure 4:
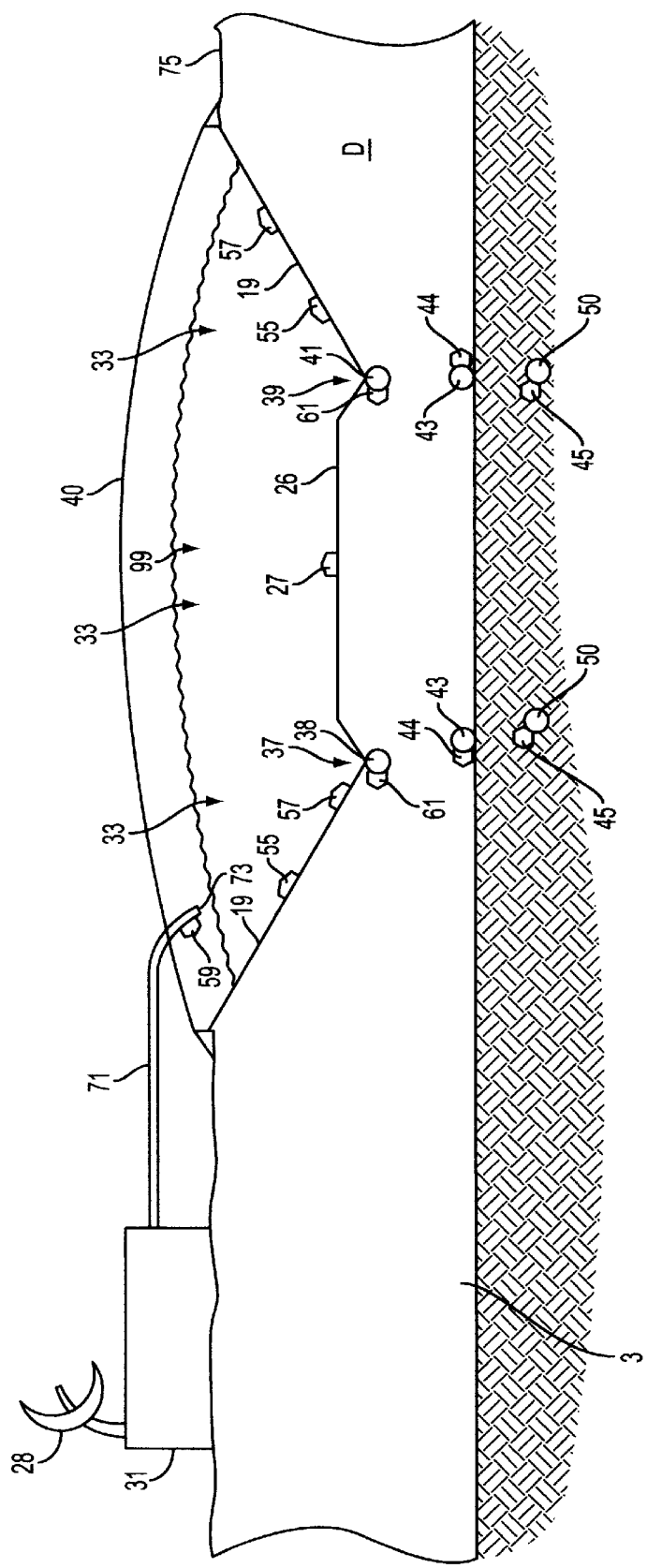
FIG. 4 is a side view of a gypsum stack formed to include a concavity for containing waste such as biomass and controlling or monitoring stations.

FIG. 4 is a side view of a gypsum stack formed in place to include a concavity for containing biomass and at least one monitoring and controlling stations. Gypsum stack B, which is formed of waste gypsum 3 that has been transported to the site by means of pipes containing an aqueous slurry of waste gypsum 3 that has been sequentially directed over normal ground level 1, such that, over time, concavity 33 was formed. Thus, the present invention comprehends the formation of gypsum stack containment facilities without the necessity of excavation or reformation of an existing gypsum stack. FIG. 4 shows one of many permutations of concavities according to the invention. Concavity 33 is formed by sloping walls 19, sump 39, flat bottom 26, and sump 37. Sump 37 is provided with concavity drain 38, having sensor 61 for sensing, among other things, fluid flow, temperature, composition, or any other parameter sought to be measured. Sump 39 is provided with concavity drain 41 having sensor 61. Sloping sidewalls 19 are provided with chemical sensors 55 and fluid sensors 57 for monitoring the contents of concavity 33. Sump bottom 26 is provided with bottom sensor 27 for measuring any of the desired parameters of the substance stored in concavity 33, such as pressure, temperature, bacterial load, or the composition of biomass 99, which nearly fills concavity 33. Concavity 33 is provided with cover 40 in order to seal off the contents of the concavity and provide for containment of gasses or other byproducts of the waste biomass 99 contained therein. Gypsum stack D is also provided with monitor/control station 31 which is in physical, electrical, or fluid communication with sensors 55, 57, 61 and 27, as well as being in communication with concavity drains 38 and 41. Gypsum stack D is provided also with aboveground drains 43 and aboveground drain monitors 44, as well as below ground drains 45 and belowground drain monitors 50. Concavity 33 communicates with monitor/control station 31 by means of gas management pipe 71, which extends from monitor control station 31 through cover 40. Gas management pipe 71 is provided with aperture 73 which is disposed in the vicinity of biomass 99. Gas management pipe 71 is provided also with gas sensor 59 which measures the pressure, amount and type of gas produced in concavity 33. Monitor control station 31 is provided with antenna 28 for communicating data collected from sensors 59, 55, 57, 61, 27, 44 and 50 by way of wireless telemetry to owners or operators of the system. Wiring, pipes, fiber optic cables and other means for collecting data from the various sensors and delivering it to monitor control station 31 are not shown. Nonetheless, as one of ordinary skill in the art will understand, these means may comprise wires, pipes, fiber optic cables, radio waves or other forms of telemetry, and comprehend other means known and suitable for the collection, storage, analysis and communication of such data.

Figure 5:
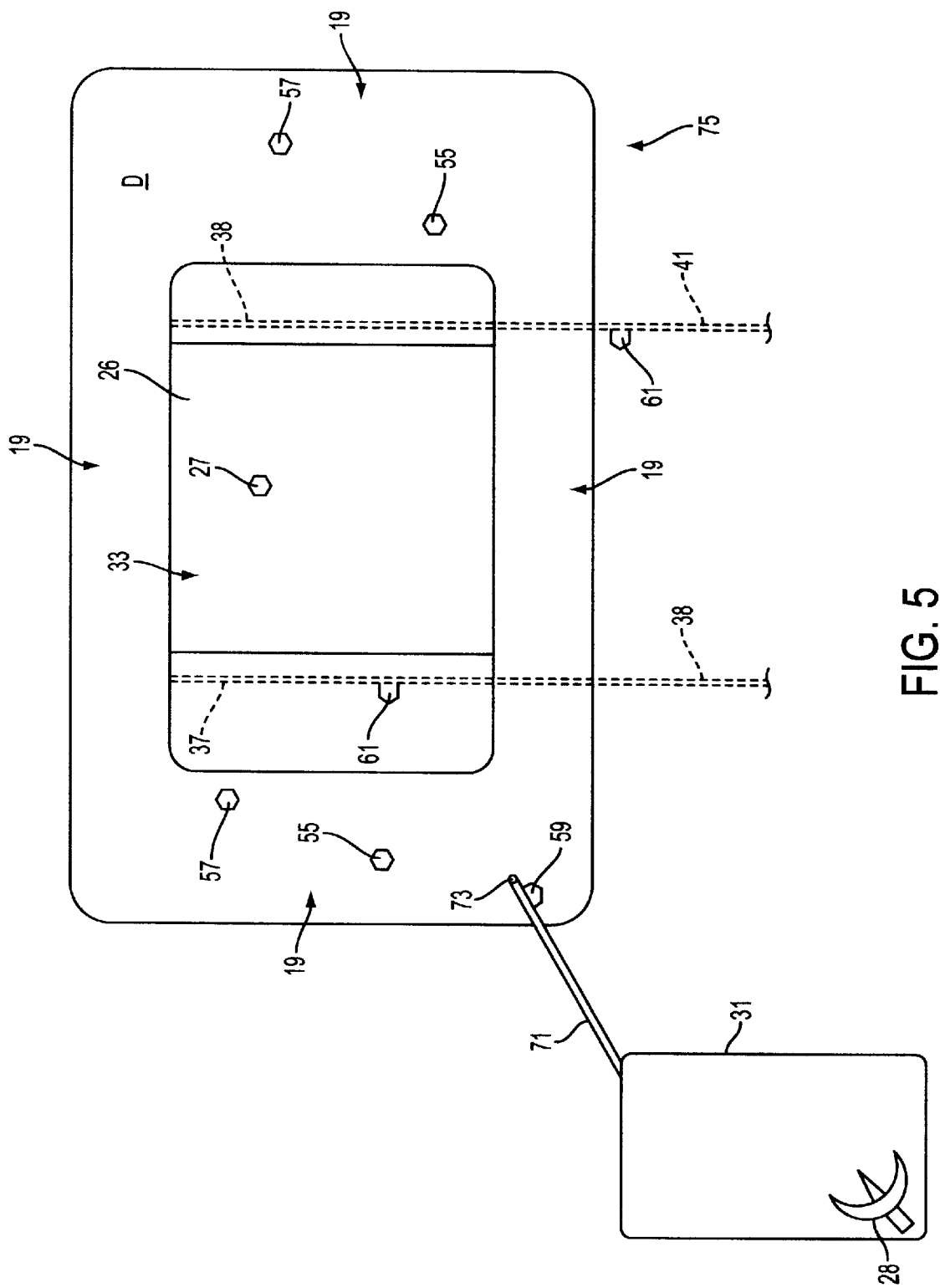
FIG. 5 is a top view of the gypsum stack containment facility shown in FIG. 4.

FIG. 5 is a top view of the gypsum stack containment facility shown in FIG. 4 and shows one of many possible combinations of sensors and other waste containment elements according to the invention. Gypsum stack D is formed to include concavity 33 as is shown in FIG. 4. Concavity 33 is provided with sumps 37 and 39, concavity drains 38 and 41, sensors 55 and 57, positioned at different heights on sloping sides 19. Drain 61 is positioned proximate to the flow of drain pipe 38, while sensor 61 is positioned proximate to drain pipe 41 but distal from concavity 33 and sensor 27 disposed on flat bottom 26. Monitor control station 31, having communication antenna 28, is provided with numerous physical, electrical and optical connections (not shown) to the various sensors. Gas management pipe 71 communicates between monitor control station 71 and concavity 33 which is provided with gas sensor 59, disposed proximate to aperture 73 of gas management pipe 71. In this arrangement among others, gas management pipe 71 can be used to recover gases such as methane, ethane, and carbon dioxide, for example, from the decomposition of biomass such as harvested corn stalks, sugar cane, water plants fish or animals.

Figure 6:
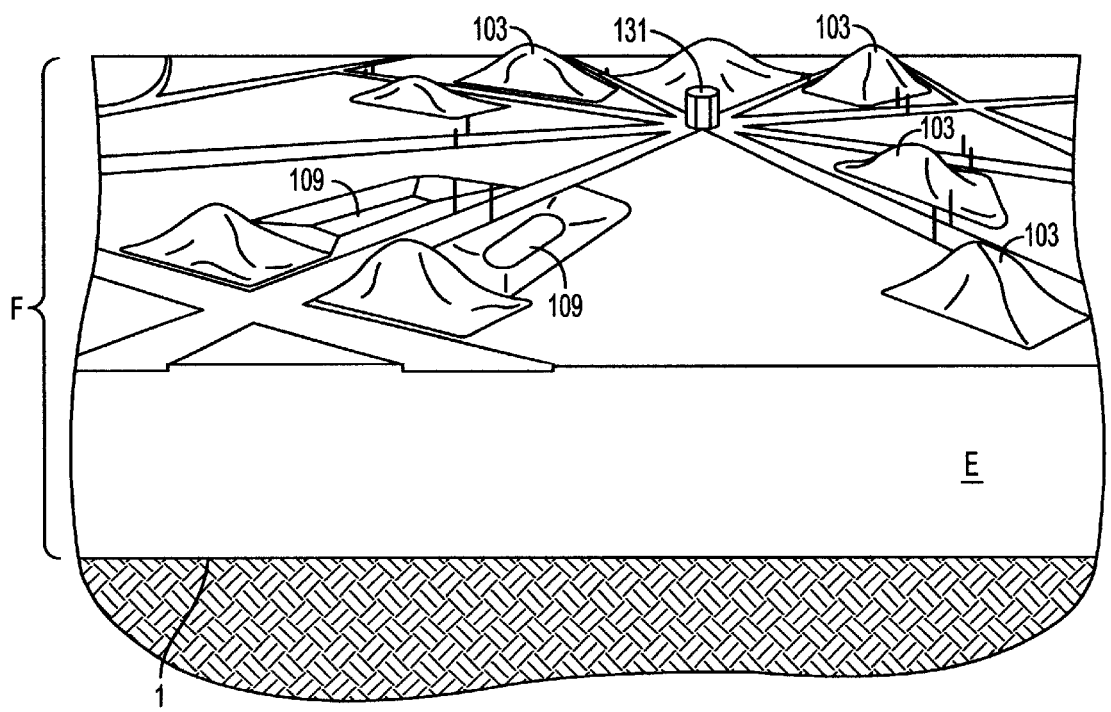
FIG. 6 is an elevated side view of a gypsum stack containment facility farm having a central control facility.

FIG. 6 is an elevated side view of a gypsum stack containment facility farm F disposed upon and within gypsum stack E that is situated above natural ground level 1. Farm F includes covered containment facilities 103 and open concavities 109 prepared for receiving waste for containment or processing. Farm F is provided also with central monitoring and control facility 131 that is constructed and arranged to communicate with containment facilities 103 and open concavities 109.

What is claimed is:

1. A waste containment facility formed at least partly from a gypsum stack, said facility being constructed and arranged to comprise at least one concavity suitable for the storage or processing of non-gypsum waste.

2. The containment facility of claim 1, wherein said waste is in one or more forms from the group consisting of solids, liquids, gases, or combinations thereof.

3. The containment facility of claim 1, wherein said waste comprises one or more from the group consisting of industrial waste, phosphate waste, biomass, refuse from a community, and sewage.

4. The containment facility of claim 1, wherein said concavity is provided with one or more sheetlike elements from the group consisting of membranes, geomembranes, geosynthetic clay liners, felt, glass fibers, fiberglass, filtration fabrics, geonets, geotextiles, geogrids, geopipes, and geocomposites. Lined.

5. The containment facility of claim 4, wherein said one or more sheetlike elements functions as an impermeable liner for said concavity.

6. The containment facility of claim 5, wherein said cover system is at least partially removable.

7. The containment facility of claim 4, wherein said one or more sheetlike elements functions as a permeable liner for said concavity.

8. The containment facility of claim 4, wherein said one or more sheetlike elements functions for said concavity as one or more from the list consisting of liners, filters, leachate collectors, sumps, permeable covers, impermeable covers, removable covers, permanent covers, microbial reservoirs, drains, drain matrices, partitions and subcontainers.

9. The containment facility of claim 4, wherein said sheetlike elements comprise one or more from the group consisting of HDPE, ZFPE, TVC, and fPTR.

10. The containment facility of claim 1, further comprising a cover system.

11. The containment facility of claim 1, further comprising leachate sumps and leachate removal and processing systems.

12. The containment facility of claim 1, further comprising at least one drain.

13. The containment facility of claim 1, further comprising valving means for directing or controlling the flow of fluids or leachate from said waste.

14. The containment facility of claim 1, further comprising means for monitoring the content, conditions, or changes thereof with respect to said waste contained in said facility.

15. The containment facility of claim 14, wherein said means for monitoring includes one or more from the group consisting of data collection means, data forwarding means, data analysis means, gas detectors, gas identification sensors, chemical sensors, pressure sensors, temperature sensors, fluid flow sensors, pH sensors, gas sampling means, gas recovery means, microbial sensors and microbial condition sensors.

16. The containment facility of claim 1, further comprising means for controlling the conditions, content, and changes of waste contained in said facility.

17. The containment facility of claim 1, wherein said concavity is formed completely from a gypsum stack.

18. The containment facility of claim 1, comprising a plurality of concavities suitable for the storage or processing of waste.

19. A method for forming a waste containment facility from gypsum waste, comprising the steps of:

a. providing a gypsum stack comprising gypsum waste, and b. excavating said gypsum stack to comprise at least one concavity suitable for storing or processing non-gypsum waste materials.

20. The method of claim 19, further comprising the step of:

c. providing a lining for said at least one concavity.

21. The method of claim 20, wherein said lining comprises one or more sheetlike elements from the group consisting of membranes, geomembranes, geosynthetic clay liners, felt, glass fibers, fiberglass, filtration fabrics, geonets, geotextiles, geogrids, geopipes, and geocomposites.

22. The method of claim 21, wherein said one or more sheetlike elements functions for said concavity as one or more from the list consisting of liners, filters, leachate collectors, sumps, permeable covers, impermeable covers, removable covers, permanent covers, microbial reservoirs, drains, drain matrices, partitions and subcontainers.

23. The method of claim 20, wherein said lining comprises one or more cementitious materials or concrete.

24. The method of claim 19, further comprising the step of
   d. providing for said at least one concavity, one or more from the group consisting of pumps, drains, drain matrices, sumps, leachate collection systems, valves, valving means for directing or controlling the flow of fluids or leachate from said waste, and one or more means for monitoring the content, conditions, or changes thereof with respect to said waste contained in said facility.

25. The method of claim 24, wherein said means for monitoring includes one or more from the group consisting of data collection means, data forwarding means, data analysis means, gas detectors, gas identification sensors, chemical sensors, pressure sensors, temperature sensors, fluid flow sensors, pH sensors, gas sampling means, gas recovery means, microbial sensors and microbial condition sensors.

26. The method of claim 19, further comprising the step of
   e. providing for said at least one concavity, means for controlling the conditions, content, and changes of said waste contained in said facility.

27. The method of claim 19, wherein a plurality of concavities are provided.

28. The method of claim 27, wherein at least one monitoring and controlling facility is provided to monitor or control the conditions, content or changes in said plurality of concavities.

29. A method for converting a gypsum stack into a container suitable for processing or storing non-gypsum waste comprising the steps of:
   a. providing a gypsum stack, and
   b. adding phosphogypsum waste onto said stack such that at least one concavity is formed on top of said stack, said concavity being suitable for functioning to contain or processing said non-gypsum waste.

* * * * *